MEMORY SYSTEM UTILIZING THIN MAGNETIC FILMS

Filed Aug. 7, 1961

3 Sheets-Sheet 1

INVENTOR
PETER KUTTNER

BY J. Donald Weber, Jr
AGENT 3,200,381
Patented Aug. 10, 1965

3,200,381

MEMORY SYSTEM UTILIZING THIN MAGNETIC FILMS

Peter Kuttner, Philadelphia, Pa., assignor to Sperry Rand Corporation, New York, N.Y., a corporation of Delaware Filed Aug. 7, 1961, Ser. No. 129,716
6 Claims. (Cl. 340—174)

This invention relates to a memory system utilizing thin magnetic films. More particularly, the invention relates to a memory system which permits non-destructive readout by utilizing what are called "double-threshold" thin magnetic films. In addition, the system utilizes coincident current techniques to produce a magnetic thin film memory in the form of a matrix.

The use of coincident current techniques in matrix memories for example utilizing magnetic cores such as ferrites, is well known. Moreover, the use of such magnetic cores has been so developed that magnetic matrix memories may be provided which have extremely small dimensions. The utilization of these matrix memories has been highly developed in view of the advantages in the operation thereof. For example, matrix memories are often used in the role of temporary or short-term memory units. That is, in many large scale business machines for example computers, information may be stored in drums or on tape. This type of storage is commonly called bulk storage or external storage, or the like. Moreover, the information stored in such external storage, is obviously accessible only at a very slow rate. Thus, for example, it may be necessary to scan large areas of drum surfaces or tape surfaces (if not the entire surface) in order to obtain the information desired. Consequently, many systems utilize what may be termed a temporary storage or internal storage. This internal storage system is often in the form of a core matrix system. That is, a plurality of cores are arranged in X and Y coordinates (rows and columns). The number of rows and columns is dependent upon the length of the words of information which are to be stored in the memory. In addition, a plurality of planes, where a plane is defined by the X and Y core coordinates, may be stacked parallel to each other. Interconnections may be made between each of the parallel planes thereby to provide a three dimensional matrix. This is a physical set-up often encountered.

In order to permit the operation of a form of magnetic-core matrix memory system, coincident current techniques are often used. As is well known, coincident current techniques require that a signal approximating one-half of the current needed to flip a magnetic core from one magnetic condition to another magnetic condition is supplied on one of the conductors linking each core. In addition, a similar current signal, again approximating one-half of the current required to flip the core is applied on another conductor linking each core. Thus, one-half of the "flipping current" is applied to an X conductor and a similar signal of one-half of the "flipping current" is applied to a Y conductor. Only the core located at the intersection of these conductors is "flipped." Since the signal applied to each conductor is insufficient to flip any particular core, none of the other cores along each of the aforementioned conductors will be flipped. Therefore, information may be read into any particular core in the matrix where the core is designated by the X and Y coordinates. Means for retrieving the information so stored in this type of matrix memory are well known.

Engineering developments have led to a smaller matrix dimensions whereby the overall size of the memory system has been decreased. In addition, alternative methods for mounting the cores have been suggested which further reduce the size of the memory systems. However, the trend has been to smaller and smaller memories with faster and faster information access time. One of the components being developed with these advantages in mind is the magnetic thin film.

It has been shown that there are several types of thin magnetic films. One particular type of thin film which has unique properties has been produced. These films have been called "double threshold films." These films have been developed in the laboratories of Remington Rand Univac, Division of Sperry Rand Corporation, and a detailed description of their fabrication may be found in the co-pending applications of Arnold Schmeckenbecher entitled "Metal Chelate Polymers," Ser. No. 39,830, filed June 30, 1960; "Variable Axis Magnetic Films," Ser. No. 40,008, filed June 30, 1960, and now U.S. Patent No. 3,124,490; "Method of Producing Magnetic Films," Ser. No. 39,775, filed June 30, 1960, and now abandoned.

Briefly, these films, which are on the order of a few Angstroms thick, may be characterized in that the operation of a double threshold film involves only a single magnetic direction. Moreover, the process of magnetization does not depend upon the diffusion of atoms throughout the thin films. The hysteresis loop properties of a typical double threshold film contemplate ranges of different magnetic properties between the thresholds and determined by the application of different drive fields. Each of these ranges is defined by at least a lower threshold value and an upper threshold value or level. The threshold values relate to the magnitude of the driving field, H, applied to the thin film and the prior history of the film. Thus, if the driving field, H, has a magnitude below a certain first threshold value, for example 2 oersteds, there will be no magnetic activity or change within the thin film and the film remains as it existed prior to the application of the H field. If, however, the driving field, H, has a magnitude above the aforementioned first threshold (2 oersteds), but below a second threshold, for example 4 oersteds, magnetic domain walls, if any, within the thin films will be moved. That is, the magnetic moment of the various domains will attempt to become aligned with the driving force H. In the event that the driving force, H, exceeds the second threshold value (4 oersteds), but not a third threshold value, for example 6 oersteds, domain walls will be created or nucleated in the usual manner. Clearly, it is understood that any domain walls nucleated, or initially present, will be moved by this magnitude driving force. Finally should the driving force H exceed the third threshold values, 6 oersteds, all domain walls in the thin film will be destroyed and the film may be considered to be saturated in one direction.

It may be seen, therefore, that these particular thin films have memory characteristics. Moreover, it may be seen that each of these films is such that an output signal may be produced without destroying the information stored in the film. This type of operation clearly provides a non-destructive readout element. By providing a plurality of thin films having this type of characteristic, in a matrix arrangement, a matrix memory may be produced. Moreover, by properly choosing the signals which are applied to each of the films and the magnitudes of each of these signals, it will be seen that coincident current techniques may be used. Thus, each of the films in the matrix may be linked by an X and a Y conductor. To switch a specific film to a desired magnetic state, a signal having a magnitude approximately one-half of the signal magnitude required to switch the thin film must be applied to each of the X and Y conductors linking the desired film. In addition, the films are preferably linked by erase windings, sense windings and read windings. The function of each of these windings is self-evident, in view of the name applied thereto.

Clearly, one object of this invention is to provide a non-destructive read out memory.

Another object of this invention is to utilize thin magnetic films in such a memory system.

Another object of this invention is to provide a thin magnetic film circuit using thin magnetic films having threshold characteristics.

Another object of this invention is to provide a matrix memory having extremely fast response time characteristics.

Another object of this invention is to provide a miniaturized memory system for use in business machines and the like.

Another object of this invention is to provide a matrix memory with fewer conductors linked thereto.

Another object of this invention is to provide a memory system which has low power requirements.

These and other objects and advantages of the invention will become apparent upon the reading of the following description in conjunction with the attached drawings in which.

Figure 1:
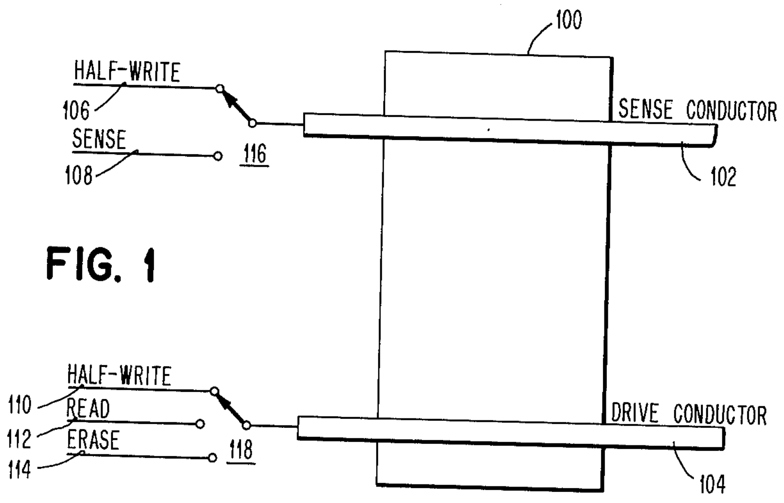
FIGURE 1 is a schematic diagram of a typical thin film memory element utilized in the instant invention.

Referring now to FIGURE 1, there is shown a film 100. This film has the characteristics which have been discussed supra and is known as a "double threshold film." Linking the film 100 are conductors 102 and 104. Conductor 102 is a sense conductor and conductor 104 is a drive conductor. As will be noted infra, the sense conductor 102 is not merely a sense conductor, but may perform a dual function and serve as a drive conductor depending upon the input to which the conductor is connected by switch 116. Similarly, conductor 104 may also function as a read-drive conductor and an erase conductor depending upon the function of switch 118. Therefore, conductors 102 and 104 are the conductors which may provide the coincident current signals to the film 100. Thus, conductor 102 may be analogized to the Y conductor and conductor 104 may be analogized to the X conductor of a core memory. It should be understood that film 100 and the associated conductors are described for purposes of convenience and for clarity. However, it is to be understood that the description of the operation of film 100 and the associated windings is to be applied to each of the films which is utilized in the memory system shown in FIGURE 4.

It will be seen that conductor 102 and conductor 104 are connected to external circuitry by the graphically represented switches 116 and 118, respectively. The switches connect the conductors to the external circuitry which includes a half-write selector conductor 106 which is coupled to sense conductor 102 and is used to apply a half-write signal. In addition, a sense conductor 108 may be connected to conductor 102 via switch 116 to sense the condition of the associated film and to carry output signals, if any, which are produced when a read signal is applied to the film.

In the case of conductor 104, switch 118 connects with a conductor 110. Conductor 110 is the other half-write selector conductor and is used to apply a half-write signal. In addition, switch 118 connects conductor 104 to read conductor 112 which carries the signals which produce output signals in the sense conductor and also to erase conductor 114 by means of which erase signals are applied to the film to remove any information previously written in.

Thus, when switch 118 connects conductor 114 to conductor 104 it will be seen that a large erase pulse will be passed through conductor 104 whereby the film will be erased or driven to a one domain condition with the magnetic moment in a predetermined direction. When switch 118 connects conductor 110 to 104, it will be seen that a half-write signal will be applied to conductor 104. As will be described subsequently, this half-write signal will effect no magnetic change in the film 100. If, however, while the half-write signal is being applied to film 100 via conductors 104 and 110 and switch 118, another half-write signal is applied to film 100 via conductors 106 and 102 and switch 116, it will be seen that the film 100 will be switched to what may be defined as its "one" state. That is, the application of two half-write signals creates a current which produces a sufficiently large driving field, H, which has a magnitude greater than the lower threshold level for the film. Therefore, the film is switched to its "one" condition. Subsequently, with the application of a read signal to film 100 by conductor 112, switch 118 and conductor 104, a signal will be produced in conductor 102. If the switch 116 is coupled to sense wire 108, a signal produced in conductor 102 will pass through conductor 108 to the sense means (not shown).

Figure 2:
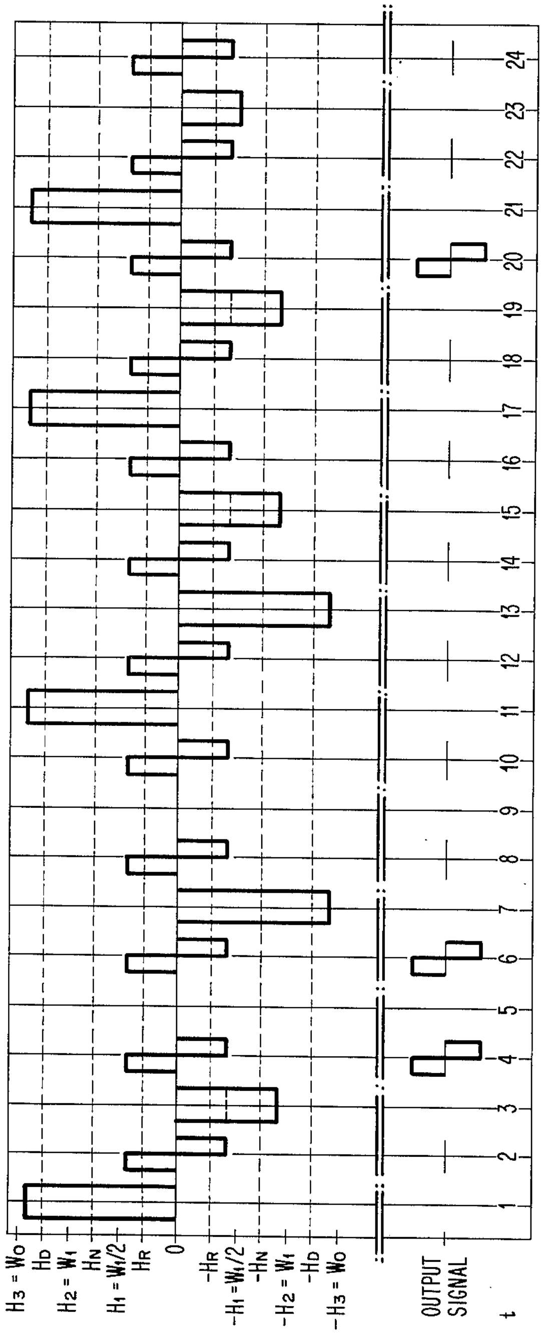
FIGURE 2 is a graphic showing of the threshold values which define the magnetic conditions of the thin films and the output signals derived from various input signals.

The operation of the device shown in FIGURE 1 may be more easily understood by concurrently referring to the chart shown at FIGURE 2, wherein various signals are applied to the various conductors and the outputs produced are also shown. Moreover, FIGURE 2 shows the threshold values of the films. These thresholds may be designated as follows:

$H_R$=the driving force threshold which when exceeded causes movement of magnetic domain walls $H_N$=the driving force threshold which when exceeded causes nucleation of domain walls $H_D$=the driving force threshold which when exceeded causes domain walls to be destroyed.

Thus, during time period T1, a large erase signal is applied to conductor 104 via conductor 114 and switch 118. The erase signal is predetermined to be sufficiently large to drive the film to the region where all magnetic domain walls are destroyed. In the instant exemplary embodiment, this signal is greater than $H_D$, or 6 oersteds for example. This signal, in effect, creates a thin magnetic film comprised of one domain with a magnetic moment, of course, in one direction which may be defined, for purposes of explanation, as the positive direction.

The application of the read pulse, which is greater in magnitude than the $H_R$ threshold, during time period T2 creates no output on the sense winding 102 and similarly sense conductor 108 which is connected thereto by switch 116. That no output signal is created is obvious since there are no domain walls in the thin film which could move, in response to read pulses, as required to create a changing magnetic field in the sense conductor 102 so that a voltage signal is induced.

During time period T3, there is shown a negative pulse having a magnitude between $-H_N$ and $-H_D$. This signal is defined as a write-one signal and is predefined as comprising two simultaneous half-write signals. That is, it is necessary that a half-write signal be applied to film 100 via conductors 102, 106 and switch 116 simultaneously with the application of a half-write signal to the film 100 via conductors 104, 110 and switch 118. Thus, a "one" is written into thin film 100. With the application of the read signal during time period T4, an output signal is produced on the sense conductor 102 which is transferred to sense conductor 108 by switch 116.

Thereafter, during time period T5, it may be seen that there is no pulse applied to the drive conductor 104. Consequently, film 100 remains in the same magnetic condition which it had prior to the application of the application of the read signal during time period T4. Therefore, during the time period T6 with the application of a read signal, an output signal is again produced on sense conductor 102. It will be seen that due to the fact that the information stored in the film 100 has not been altered with the application of read signals, this film storage is in fact a non-destructive read out memory element. A further comment regarding the configuration of the read signal is presented in reference to FIGURE 3.

During time period T7, an input signal is applied to the film. This signal has a magnitude which is greater than $-H_D$. That is, the signal applied during time period T7 is identical (except for polarity) with the erase signal applied during time period T1. Consequently, all of the domain walls in film 100 will be destroyed. This, therefore, effectively produces a film comprising a single domain with a single magnetic moment which may be defined as being in the negative direction. It should be noted that no provision is made for the application of such a "write-zero" signal. However, for completeness, the operation of the device is described therefor. Moreover, it may be considered that such a signal could be the result of some error of the external apparatus in the nature of an oversized half-write signal or a reversed polarity erase signal. It should be understood too, that for some purposes it may be desirable to actually write-in a zero and this type of operation is contemplated.

With the application of the read signal during time period T8, there is no output signal produced on sense conductor 102. This clearly, is due to the lack of movable domain walls in the film. Therefore, the read signal cannot create a changing magnetic field which links the sense conductor 102 and induces a voltage therein. Once again, during time period T9, there is applied no input signal. With the application of the read pulse during time period T10 there will be produced no output signal for the same reasons as applied during time period T8. Thus, because of non-destructive read out properties of the memory element it will be seen that the signal applied during time period T7 is an effective write-zero signal which again (as in the case of the write-one signal at T3) is not destroyed by the application of read pulses during time periods T8 and T10.

During time period T11 an erase signal is applied to the film 100 via conductors 104, 114 and switch 118. The application of the read signal during time period T12 via conductors 104, 112 and switch 118 again produces no output on sense conductor 102. This operation is similar to that described for time periods T1 and T2.

The signal applied during T13 is again, as in the case of the signal presented during time period T7 a write-zero signal which does not permit the production of an output signal during time period T14 in response to the application of a read signal.

As another feature of the non-destructive properties of the magnetic element, it will be seen that a normal write-one signal is applied during time period T15. However, it will be recalled that the write-zero signal during time period T13 converted the film into a single domain having a magnetic moment in one direction. Since the write-one signal applied during time period T15 is in the same magnetic direction as the signal applied during time period T13, it will be seen that all of the magnetic moments are already aligned in the direction which they would tend to take in accordance with the signal applied during time period T15. Therefore, the signal applied during time period T15 cannot produce magnetic domain walls which, consequently, means that an output signal will not be derived on sense conductor 102 during time period T16 when a read signal is applied thereto.

During time period T17 another erase signal is applied. This erase signal causes each of the magnetic moments in the thin film 100 to reverse itself and form a single domain with the magnetic moment thereof in the positive direction. As described supra, no output signal is produced when the read signal is applied during time period T18. Furthermore, the cases which arise due to the signals applied during the time periods T19–T22 are also analogous to situations described supra.

The situation presented by the application of a single half-write signal during time period T23 is important. This condition is the condition often presented to a majority of the films during the write-in operation. That is, the application of a half-write signal is made to at least an entire row and an entire column of films in order to write a "one" in any one film. Therefore, it must be clear that, with the exception of the specifically desired film, information must not be written-in and improper films must not be switched. It is seen that the application of a read signal during time period T24 does not produce an output signal. This is because the original half-write signal is defined to be less than $-H_N$ so that no domain walls are nucleated. In the absence of movable walls the read signal cannot cause the production of an output signal on the sense conductor.

Figure 3A:
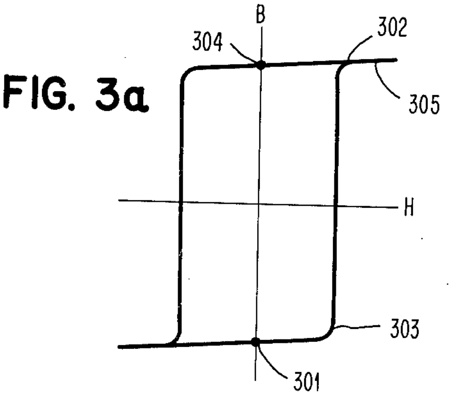
FIGURE 3 shows the B-H hysteresis characteristics of the films in the various magnetic conditions.
Figure 3B:
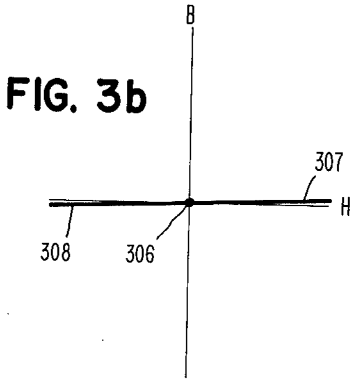

Referring now to FIGURES 3A and 3B there are shown B-H hysteresis characteristic loops for the double threshold magnetic films in different regions of the magnetic activity. Thus, the hysteresis loop shown in FIGURE 3A is the hysteresis loop which represents the region between $H_N$ and $H_D$, the region wherein the films contain domain walls. On the other hand, the characteristic shown in FIGURE 3B represents the hysteresis characteristic of the films when they are in any region other than the region between the $H_N$ and $H_D$.

Thus, if a signal is applied to a film via the drive conductors, such that the signal is of the magnitude which exceeds $-H_N$ but does not exceed $-H_D$, the film has walls created therein. The hysteresis characteristic for the film is thus substantially rectangular as shown by FIGURE 3A. Therefore, a read signal applied to the film via the read conductor, for example conductor 104 of FIGURE 1 drives the film along the hysteresis characteristic presented thereto the configuration of which is that shown in FIGURE 3A. Consequently, as discussed supra, the read signal must be of an alternating polarity configuration such as those shown in FIGURE 2. That is, if the film is initially assumed to reside at its negative remanence location 301 prior to the application of a read signal, but subsequent to the application of a writing signal, the application of the read signal will then drive the film along the hysteresis characteristic to the location 305. While the film is being driven from location 301 to 302 (or beyond) via location 303, an output signal is generated on the sense conductor, for example conductor 102 of FIGURE 1. If the read signal was not of alternating configuration, the film would relax to its positive remanent condition 304 when the read signal was removed. With the application of a subsequent read signal as in the case of time period T6 in FIGURE 2, the film would be driven from 304 to location 305 via location 302 and it is clear that the output signal generated thereby would be extremely small and the non-destructive readout property would be ineffective. On the other hand however, because of the alternating configuration of the read signal it will be seen that when the read signal terminates the film will relax to its negative remanent condition 301.

In the event that the film initially resided in the other magnetic condition, that is the condition where there are no magnetic domain walls therein, the hysteresis characteristic is represented by FIGURE 3B. It should be noted that the film can be placed in a condition such that the hysteresis characteristic of FIGURE 3B exists by the application of no signal, an erase signal, a write-zero signal, or a single half-write signal being applied thereto. Thus, with the application of a read signal, the film is driven from its remanent condition 306, to location 307 or location 308 depending upon the polarity of the read signal. It is clear that the signal produced by driving the film along this hysteresis characteristic is extremely small. Moreover, it should be noted that the hysteresis characteristic shown in FIGURE 3B is an exaggerated approximation. That is, the actual hysteresis characteristic of the film in the condition represented by FIGURE 3B may, in fact, be much flatter. In view of the flatness of this hysteresis characteristic, the output signal may be so small as to be negligible.

These hysteresis characteristics shown in FIGURES 3A and 3B are inherent characteristics of the double threshold thin magnetic films. In some applications this type of hysteresis characteristic is not crucial. However, in the utilization of these films in memory devices (specifically nondestructive read-out memory devices) these characteristics must be taken into account and for this reason it is necessary to have a bi-polarity read signal.

Figure 4:
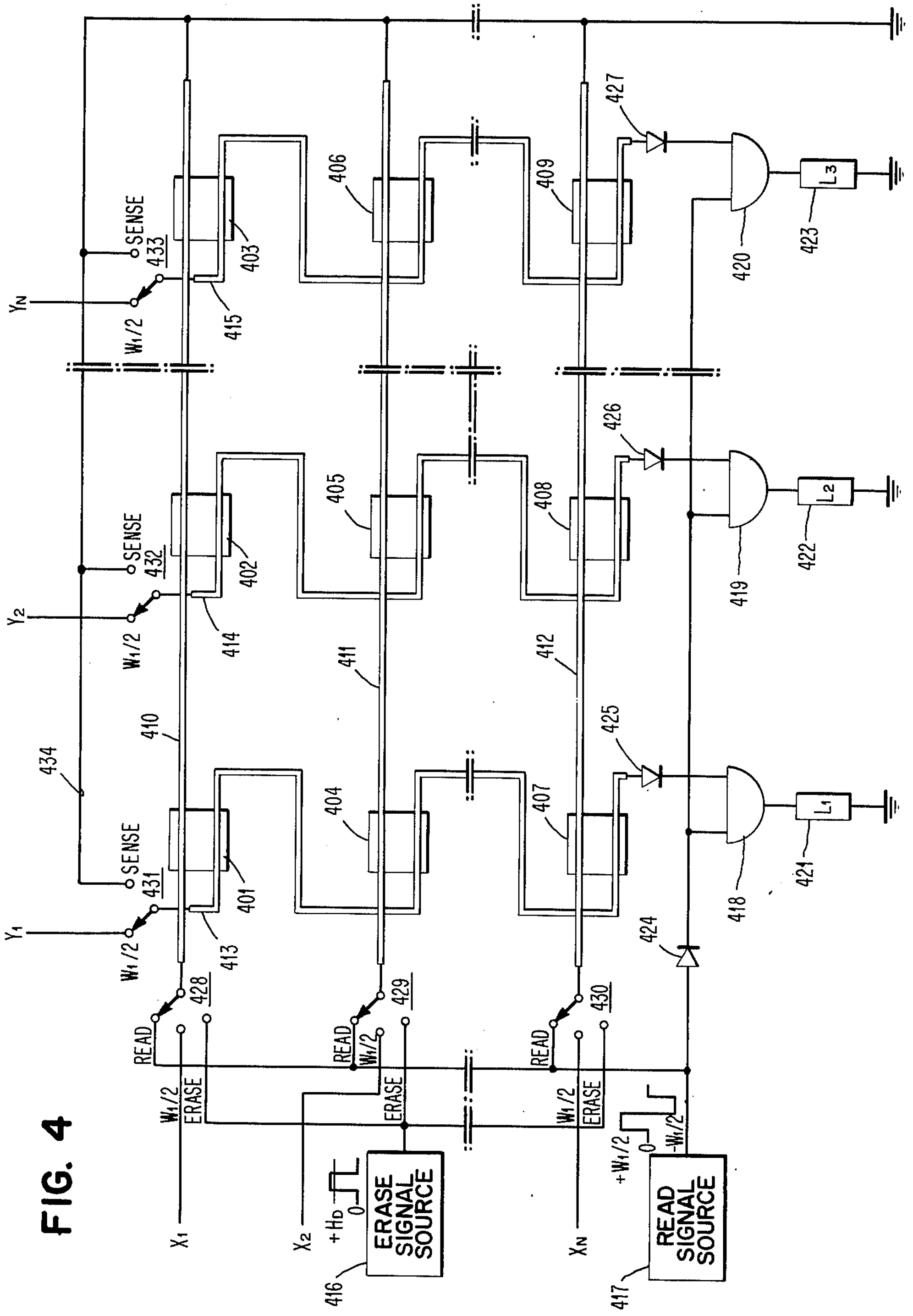
FIGURE 4 is a schematic diagram of a typical memory system utilizing an exemplary three-by-three matrix.

Referring now to FIGURE 4 there is shown a typical matrix arrangement comprising nine thin magnetic films. This matrix is exemplary only and larger numbers of films may be utilized. In fact, larger matrices are suggested by the broken X and Y conductors and provisions of N of such conductors. These films, 401 to 409 inclusive, are all double threshold films similar to film 100 of FIGURE 1. Moreover, each of these films functions according to an operational chart similar to that shown in FIGURE 2 and each of the films has characteristics similar to those shown in FIGURE 3. Thus, each one of the films 401 to 409, inclusive, will follow the operation described above. Furthermore, each of the films is linked by an X-conductor. For example, films 401, 402 and 403 are linked by conductor 410. This X-conductor is similar to the conductor 104 of FIGURE 1. That is, the conductor has applied thereto signals which are used to read, write or erase. Moreover, these signals are applied via a switch 428 similar to switch 118 of FIGURE 1.

Films 404, 405 and 406 are similarly linked by X-conductor 411 which is connected to the read, half-write and the erase signal conductors by the switch 429. Films 407, 408 and 409 are linked by X-conductor 412 which is connected to the read, half-write and erase signal conductors by switch 430.

It should be noted here that the read signal source 417 and erase signal source 416 may be any well known source which supplies signals which are suggested in FIGURE 4 or FIGURE 2. The sources for the half-write signals which are graphically represented by $X_1$, $X_2$ and $X_N$ may, in fact, comprise any type of external circuitry which may be utilized for example in large scale business machines or the like. It is not believed necessary to fully describe the method for applying signals since this is also known in the art.

It will be seen that each of the films is similarly linked by a Y-axis conductor. This Y-conductor is similar to sense conductor 102 of FIGURE 1. In particular, films 401, 404 and 407 are linked by Y-conductor 413. It will be noted that when adjacent to the films, this conductor is shown as being parallel to the X-conductor. This arrangement is provided in order that the half-write signals supplied by the X- and Y-conductors are cumulative or additive in effect.

As will be discussed infra, the two conductors need not be spaced apart but may in fact be mounted on top of each other. However, it will be seen that this is a parallel construction. Furthermore, the Y conductors are shown as zigzagging back and forth between the films in order that the conductors will pass current signals adjacent the films in the same direction. It must be understood that this is not necessary and that the Y-conductor might actually be placed such that it would zigzag only at the films rather than in between the films. However, it would be necessary that alternate X-conductors would be furnished with the signals either of opposite polarity or from opposite sides of the matrix. This type of arrangement can be fabricated without a great deal of complexity, but for purposes of explanation the embodiment of FIGURE 4 is preferred.

It will be seen that films 402, 405 and 408 are linked by Y-conductor 414 and films 403, 406 and 409 are linked by Y-conductor 415. Again, conductors 414 and 415 are similar to conductor 102 of FIGURE 1. In addition, conductor 413 is linked by switch 431 (similar to switch 116 in FIGURE 1) to the sense conductor 434 (similar to conductor 108 of FIGURE 1) and to the half-write source $Y_1$. Similarly, switches 432 and 433 connect Y-conductors 414 and 415 respectively to the external half-write sources $Y_2$ or $Y_N$ respectively as well as to the sense conductor 434.

Although not necessary for proper operation of the circuit, diodes 425, 426 and 427 are inserted into the Y conductors 413, 414 and 415 respectively. These diodes will permit passage only of positive going pulses. As suggested, these diodes are not absolutely necessary but provide a desired function in a preferred embodiment of the invention. The diodes 425, 426 and 427 are each coupled to one input of gates 418, 419 and 420 respectively. The other inputs of these gates are all connected to the read signal source 417 via another diode 424 which similarly permits the passage only of positive going signals. Gates 418, 419 and 420 may preferably be AND gates which permit the passage of a signal therethrough only in response to the simultaneous application of a positive pulse from the read signal source and from the respective Y-conductor attached thereto. When a signal is passed by one or more of the gates, the signal is read across the appropriate load attached thereto and designated as 421, 422 and/or 423.

The operation of the memory circuit is straightforward, in view of the description accompanying FIGURE 1. Thus, assume that it is desired to write a "one" into film 405 for example. Switches 428 through 433 inclusive are commutated by any of the known means. When switch 429 is in proper position, a half-write signal is applied by source $X_2$ to the conductor 411. Simultaneously, a half-write signal is applied by source $Y_2$ to conductor 414. As described supra, the half-write signal applied via the X conductor is not sufficient to switch any one of the films 404, 405 or 406. Similarly, the half-write signal applied by the Y conductor is not, in and of itself, sufficient to switch any of the films 402, 405 or 408. However, in view of the fact that two half-write signals are simultaneously applied to film 405, this film is switched and a "one" is effectively written therein.

After the commutation of the various switches has been completed, it is desired to read out the information stored in the memory. Thus, again switches 428, 429 and 430, etc. will be commutated in the read position while switches 431, 432 and 433, etc. will be commutated in the sense position. Due to the fact that none of the films 401, 402 or 403 was switched to the "one" condition, a read signal applied thereto by conductor 410 will not cause the read out of a "one" or any of the Y-conductors. (Similar discussion applies to conductor 412 and to films 407, 408 and 409.)

However, with the application of a read signal to conductor 411, a voltage will be induced in sense winding 414 due to the domain wall movement in film 405. Since the read signal is the alternating signal discussed in FIGURE 2, the voltage signal will be similar. This voltage signal is then fed to diode 426 which transmits only the positive going portion thereof. At the same time, in view of the application of the read signal via diode 424, a positive going signal will be applied to the other input of gate 419. Simultaneous application of these two input signals will cause the gate 419 to produce an output signal. This output signal will be read across load 422.

It may be seen that the operation of any one of the other films in the circuit will be similar and that information may be stored therein until deliberately erased by the application of an erase signal. Specifically, the application of an erase signal to conductor 411 will effectively erase film 405 so that the application of a subsequent read pulse will not produce a voltage signal on conductor 414. If no voltage signals are applied to any of the gates by the Y-conductors, the application of the positive going signal from read signal source 417 will be insufficient to cause the production of an output signal by these gates.

It should be noted, that there are possible alternative arrangements of the wiring as suggested supra, and other alternatives may suggest themselves to those skilled in the art. However, it is to be noted that changes in the wiring of the circuit are to be included within the scope of this invention.

Figure 5:
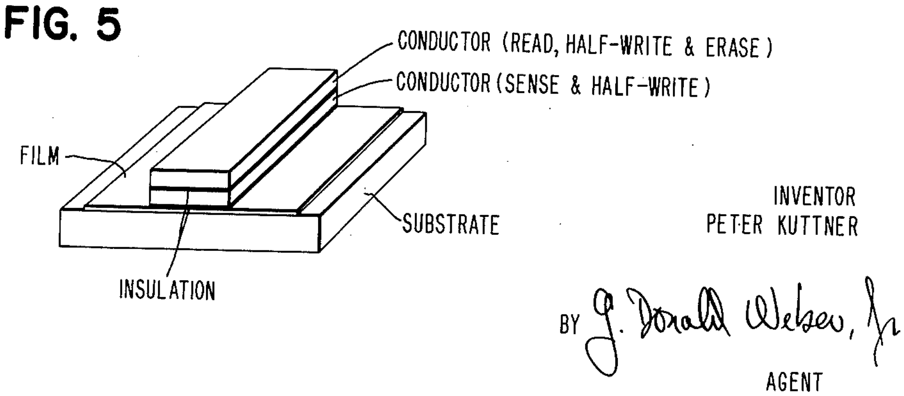
FIGURE 5 is a perspective view of a typical thin film and conductor construction.

Referring now to FIGURE 5, there is shown a proposed construction of this type of device. Thus, the thin magnetic film is deposited on a suitable substrate as defined in any of the aforementioned copending applications of Arnold Schmeckenbecher. This film may be applied by any of the desirable techniques such as evaporation, deposition, etc. As shown in FIGURE 5, there are two conductors deposited on the substrate and film member. In this type of construction, of course, an insulation layer must be applied between the film and the conductor which is immediately juxtaposed. In addition, a further insulation layer must be applied between the two conductors which are applied to the substrate film member. This is obvious in order that the current signals applied to one conductor are not transferred to the other conductor thereby possibly contaminating the signals applied to further films in the memory.

A very similar type of construction is also contemplated although not actually shown in FIGURE 1. This construction calls for the application of a film to a substrate as previously discussed. However, in this construction it is contemplated that the conductors may be actually mounted on printed circuit boards in accordance with any of the well known methods. Again, these two conductors must be separated by an insulation layer. In addition, an insulation layer should be applied to the outer surface of the outermost conductor. The film and substrate member may then be placed adjacent to the printed circuit board, or vice versa. Other alternatives to the mounting of the separate components may suggest themselves to those skilled in the art, and the type of construction shown in FIGURE 5 is not limitative of the construction which can be used in fabricating a memory system suggested by FIGURE 4. Rather, other alternatives are possible, but so long as the principle of this invention is followed, the mechanics of constructing the memory are deemed to fall within the scope of the invention.

In addition, the methods of applying signals to the conductors linking the films is not to be considered limitative nor is the number of conductors applied to each film limitative. Rather, each of these devices, as described, is exemplary only in order to show the principle of this invention.

Having thus described the invention, what is claimed is:

1. A memory circuit comprising a plurality of thin magnetic films, said films exhibiting a discontinuous hysteresis loop characterized by a plurality of operating conditions which are defined by distinct threshold levels, at least one of said operating conditions characterized by said film exhibiting a single magnetic domain, another one of said operating conditions characterized by said film exhibiting a multi-domain condition, first and second means for applying drive signals to said films, said drive signals individually having a magnitude below the switching threshold of said films such that said films are not switched from the single domain to the multi-domain operating condition by the separate application of drive signals by one of said first and second signal applying means but said films are switched from the single domain to the multi-domain operating condition by the simultaneous application of signals by both of said first and second signal applying means, and means for sensing the operating condition of said film relative to said switching threshold due to the changing magnetic field produced by movement of domain walls in said film in response to the application of a drive signal by only one of said first and second means for applying drive signals.

2. A memory circuit comprising a plurality of thin magnetic films, said films exhibiting a discontinuous hysteresis characteristic which is characterized by a plurality of distinct threshold levels which define a plurality of different operating conditions, first and second means for selectively applying drive signals to said films, said drive signals individually having a magnitude below a first threshold of said films such that any magnetic domain walls existing in the films are moved but walls are not nucleated in said films by the separate application of drive signals by either one of said first and second signal applying means, said drive signals having a magnitude such that the domain walls are moved and nucleated in said films by the simultaneous application of signals by both of said first and second signal applying means, means for sensing the operating condition of said film relative to said first threshold by detecting the changing magnetic field produced by movement of domain walls in said films, and means for regularly applying read signals non-coincidentally with said drive signals and having a magnitude substantially similar to a single drive signal to produce movement in any existing domain walls in said magnetic films whereby the condition thereof may be sensed by said sensing means in the absence of a drive signal.

3. A plurality of thin magnetic films, each of said films having a plurality of threshold values which define the magnetic properties thereof relative to the driving forces applied thereto, means for applying driving forces to said films to control the properties of said films, said means for applying driving forces being coupled to said films such that said films form a matrix having rows and columns, and means for detecting information stored in said films by said driving forces said information being characterized by a formation of a plurality of magnetic domain walls in said films in response to the coincident application of the driving forces to a film by the associated row and column driving force applying means, said information detecting means being adapted to operate in accordance with the properties of said films and thereby provide an output signal when a changing magnetic field is produced by the domain walls in said films.

4. A memory device comprising a plurality of thin magnetic films, said films being arranged in rows and columns, first means for selectively applying signals to said rows of magnetic films, second means for selectively applying signals to said columns of magnetic films, each of said films exhibiting a hysteresis characteristic having a first threshold which is exceeded only when signals are applied to a film by each of the signal applying means associated with the rows and columns of film, said film exhibiting a plurality of magnetic domain walls therein when switched by the application of signals which exceed said first threshold, means for sensing the changing magnetic field produced by movement of domain walls existing in said films thereby to determine the information stored therein, and signal supplying means for causing movement of any magnetic domain walls within the film whereby a changing magnetic field is produced such that said sensing means detects the magnetic properties of the films and determines the information stored therein.

5. A memory device comprising, a plurality of thin magnetic films, each of said films having two separate operating conditions, a first operating condition characterized by the films being comprised of a single magnetic domain, a second operating condition characterized by the films being comprised of a plurality of magnetic domains having different magnetization directions and separated by domain walls, first and second pluralities of conductors, said first plurality of conductors forming rows and said second plurality of conductors forming columns in a matrix arrangement, each of said plurality of thin films disposed adjacent to one conductor of each said first and second pluralities of conductors such that two different conductors are disposed adjacent each film, a first plurality of signal supplying means, each of said first plurality of signal supplying means selectively connected to a different one of said first plurality of conductors for selectively supplying signals thereto, a second plurality of signal supplying means, each of said second plurality of signal supplying means selectively connected to a different one of said second plurality of conductors for selectively supplying signals thereto, each of said first and second pluralities of signal supplying means being capable of supplying first signals which produce magnetic fields adjacent to the associated conductor which fields are individually of such magnitude to move but not to nucleate domain walls in said films, said first signals produced by said first and second pluralities of signal supplying means operative to produce a cumulative magnetic field of such magnitude to nucleate domain walls in a film which is disposed adjacent to two conductors having said first signals supplied thereto coincidentally, said first plurality of signal supplying means being capable of selectively supplying second signals which produce magnetic fields adjacent to the associated conductor which fields are of such magnitude to destroy domain walls in said films, and signal sensing means selectively connected to said plurality of conductors for detecting a changing magnetic field produced by the movement of magnetic domain walls in a magnetic film.

6. A memory device comprising, at least one thin magnetic films, said film having two separate operating conditions, a first operating condition characterized by the films being comprised of a single magnetic domain, a second operating condition characterized by the film being comprised of a plurality of magnetic domains having different magnetization directions and separated by domain walls, first and second electrical conductors disposed adjacent to said films, first signal supplying means selectively connected to said first conductor for selectively supplying signals thereto, second signal supplying means selectively connected to said second conductor for selectively supplying signals thereto, each of said first and second signal supplying means being capable of supplying first signals which produce magnetic fields adjacent to the associated conductor which fields are individually of such magnitude to move but not to nucleate domain walls in said films, said first signals produced by said first and second signal supplying means operative to produce a cumulative magnetic field of such magnitude to nucleate domain walls in said film disposed adjacent to two conductors having signals supplied thereto, said first signal supplying means being capable of selectively supplying second signals which produce magnetic fields adjacent to the second conductor which fields are of such magnitude to destroy domain walls in said film, and signal sensing means selectively connected to said second conductor for detecting the changing magnetic field produced by the movement of magnetic domain walls in the magnetic film.

References Cited by the Examiner

UNITED STATES PATENTS

| | | | |
|---|---|---|---|
| 3,023,402 | 2/62 | Bittmann | 340—174 |
| 3,048,829 | 8/62 | Bradley | 340—174 |
| 3,058,099 | 10/62 | Williams | 340—174 |

FOREIGN PATENTS

| | | |
|---|---|---|
| 1,226,056 | 8/60 | France. |

OTHER REFERENCES

Publication: "Patterns in Thin Films Make Fast Nondestructive Memories," by Hart, Electronics, pages 126–129, February 1961.

IRVING L. SRAGOW, *Primary Examiner.*